(12) United States Patent
Hertl

(10) Patent No.: US 8,469,445 B2
(45) Date of Patent: Jun. 25, 2013

(54) MOTOR VEHICLE HEADREST

(75) Inventor: Juergen Hertl, Nabburg (DE)

(73) Assignee: Grammer AG, Amberg (DE)

( * ) Notice: Subject to any disclaimer, the term of this patent is extended or adjusted under 35 U.S.C. 154(b) by 100 days.

(21) Appl. No.: 12/858,866

(22) Filed: Aug. 18, 2010

(65) Prior Publication Data

US 2011/0198899 A1 Aug. 18, 2011

(30) Foreign Application Priority Data

Aug. 18, 2009 (DE) .......................... 10 2009 037 778

(51) Int. Cl.
  *B60N 2/42* (2006.01)
  *B60N 2/427* (2006.01)
  *B60R 21/055* (2006.01)

(52) U.S. Cl.
  USPC ..................................... 297/216.12

(58) Field of Classification Search
  USPC ..................................... 297/216.12
  See application file for complete search history.

(56) References Cited

U.S. PATENT DOCUMENTS

| | | | | |
|---|---|---|---|---|
| 3,205,005 A * | 9/1965 | Brown | ................. | 297/216.12 X |
| 3,528,703 A * | 9/1970 | Seizho | ........................... | 297/391 |
| 3,680,912 A | 8/1972 | Matsuura | | |
| 3,706,472 A * | 12/1972 | Mertens | ........................ | 297/397 |
| 4,744,601 A * | 5/1988 | Nakanishi | ............ | 297/216.12 X |
| 4,890,885 A * | 1/1990 | Grossmann | ................. | 297/284.1 |
| 5,181,763 A * | 1/1993 | Dellanno et al. | ............... | 297/391 |
| 5,290,091 A * | 3/1994 | Dellanno et al. | ...... | 297/216.12 X |
| 5,328,244 A * | 7/1994 | Ishihara et al. | ............... | 297/391 |
| 5,961,182 A * | 10/1999 | Dellanno | ................. | 297/216.12 |
| 5,975,637 A * | 11/1999 | Geuss et al. | .......... | 297/216.12 X |
| 6,402,238 B1 * | 6/2002 | Bigi et al. | ............... | 297/216.12 |
| 7,090,292 B2 * | 8/2006 | Dellanno | ................. | 297/216.12 |
| 7,537,282 B2 * | 5/2009 | Veine et al. | ............. | 297/216.12 |
| 7,926,871 B2 * | 4/2011 | Meixner et al. | .......... | 297/216.12 |

FOREIGN PATENT DOCUMENTS

| DE | 10136523 B | 2/2003 |
|---|---|---|
| EP | 0578452 B | 1/1994 |

* cited by examiner

*Primary Examiner* — Rodney B White
(74) *Attorney, Agent, or Firm* — Andrew Wilford

(57) ABSTRACT

A motor-vehicle headrest has a relatively stationary and relatively rigid support structure positioned horizontally rearward of a head of a person sitting in front of the headrest. A cushion has a front face with a central portion directly engageable with the head of the person and with a peripheral portion surrounding the central portion and not normally directly engageable with the head of the person. The cushion further has a rear face bearing rearward of the peripheral portion directly on the support and forming rearward of the central portion a substantially empty cavity at which the rear face is spaced forward from the support. The cushion is elastically deformable such that on forceful rearward engagement of the head of the person with the central portion of the front face the front face deforms into a forwardly concave shape cupping the head of the person.

6 Claims, 9 Drawing Sheets

MOTOR VEHICLE HEADREST

FIELD OF THE INVENTION

The present invention relates to a motor-vehicle headrest.

BACKGROUND OF THE INVENTION

A headrest for a motor vehicle basically serves to block excessive rearward travel of a passenger or driver of a motor vehicle in an accident. In certain crash situations, however, additional horizontal forces act upon the head of the seat occupant. U-shaped or concave headrests are known, but are not considered comfortable and have the problem of being difficult to adjust for the user.

The headrest according to EP 0 578 452 deforms to cup the head of the wearer, but does not really provide any significant resistance to side-to-side or vertical displacement of the user's head, since the peripheral regions of the cushion are undeformed and quite soft. The head-engaging part of the headrest comprises a sealed outer, flexible sack made of plastic, as well as an inner flexible sack made of plastic. An inner space of the outer sack is only partially filled with air and therefore has a slack shape. An inner space of the inner sack is filled with flexible polyester material. The inner space is connected with the inner space of the outer air sack by side holes of the inner air sack. As long as the inner air sack is not bearing a load, the polyester material takes on a certain shape and thereby stores a certain amount of air.

In the event of an impact of a motor vehicle, the head of the occupant is thrown against the head-engaging front face and first the outer, slack air sack and then the inner air sack in the bearing portion are deformed. As a result of the compression, air flows out of the inner air sack through the side holes into the outer air sack, and the sides of the outer air sack bulge out. The side portions of the outer air sack form, however, no stable side guide for the head of the occupant is because as soon as a force is exerted upon the side portion, the air can flow out of the side area of the outer sack, for example, into the middle portion of the inner space, as a result of which the side area slacks and no longer provides any face. Beyond that, the optical design possibility of this headrest is low, because of the slack outer sack.

A different headrest is described in DE 101 36 523. The head-engaging component of the headrest can be adjusted between two positions. In a first operating position, the head-engaging component offers support to the head of the occupant that is in the upright position, for example, in the event of an impact. In a second reclining position, the head-engaging component takes on a shape in which it supports the head of the occupant in a sleeping and reclining position. The head-engaging component of this headrest comprises a cushion component with an inner space that is surrounded by an air and water-tight flexible casing, by means of which the inner space can be hermetically sealed. The hermetically sealed inner space can be opened by a valve, so the volume of the inner space can be changed. After the change of the volume, the inner space is closed again by the valve, so that the volume of the inner space remains constant. An elastically deformable foam element is located in the inner space, which completely fills the inner space.

Adjustment into the reclining position is performed by compressing the foam element when the valve is open. Air can escape from the inner space. The head-engaging front face takes on a concave shape, and side support portions are formed. For forming the side support portions, the head-engaging component has insertion components consisting of hard foam, that are formed side to the inner space. Subsequently, the valve is closed so that the head-engaging front face remains in the selected position. For an adjustment into the operating position, the valve is opened. The elastic reset force loads the foam element into its original position when the valve is open, as a result of which the head-engaging component moves into the operating position when air streams into the inner space. If the headrest is in the operating position, it does not form a thrust bearing for forces that are directed horizontal to the seat direction.

In U.S. Pat. No. 3,680,912 another headrest is shown having a liquid-filled bladder than can deform and drain to cushion the user's head. This structure is complex and still does not provide solid side-to-side and vertical barrier to movement of the user's head in the event of a collision.

OBJECTS OF THE INVENTION

It is therefore an object of the present invention to provide an improved motor-vehicle headrest.

Another object is the provision of such an improved motor-vehicle headrest that overcomes the above-given disadvantages, in particular that, when the seat occupant presses back on the head-engaging front face of the cushion body during normal driving operation or during an accident, provides horizontal side-to-side barriers that protect the occupant from is injury in this manner.

In addition when the occupant of the seat does not press his/her head back against the head-engaging front face, the headrest should not have any side protrusions that limit view of the seat occupant or impair him in any other way.

The headrest of this invention must have an attractive appearance while still providing a high level of safety.

SUMMARY OF THE INVENTION

A motor-vehicle headrest has according to the invention a relatively stationary and relatively rigid support structure positioned horizontally rearward of a head of a person sitting in front of the headrest. A cushion has a front face with a central portion directly engageable with the head of the person and with a peripheral portion surrounding the central portion and not normally directly engageable with the head of the person. The cushion further has a rear face bearing rearward of the peripheral portion directly on the support and forming rearward of the central portion a substantially empty cavity at which the rear face is spaced forward from the support. The cushion is elastically deformable such that on forceful rearward engagement of the head of the person with the central portion of the front face the front face deforms into a forwardly concave shape cupping the head of the person. The term "substantially empty" here means the cavity is filled with air at ambient pressure, has no significant internal structure, and is not filled with an incompressible liquid or body of compressed air.

In other words the cushion body of the headrest has at least one cavity of the cushion that is essentially surrounded by the cushion. Thus, in the cavity, there is no cushion. In the event of a force acting upon the head-engaging front face of the cushion body, a cushion portion of the cushion body can deform and thereby deform the cavity. At least one part of the inner wall of the cavity can deform in the event of a force acting upon the head-engaging front face, because this part of the inner wall is not supported, for example, the cushion support. The volume of the cavity can decrease when the head-engaging front face is deformed, for example. As soon as no force acts upon the cushion body any longer, the cushion returns to its original shape because of its own elasticity. This way, the volume of the cavity can, for example, increase.

The cavity is vented into the interior of the motor vehicle through at least one hole. The hole can, for example, be a passage in the wall defining the cavity or it can, for example, be the air permeability of the wall. Pressure compensation between the cavity and the motor vehicle interior can take place. The fluid can flow through the hole out of and into the cavity. If the pressure in the interior of the cavity is greater than the pressure in the motor vehicle, air flows out of the cavity. If the pressure in the cavity is lower than the pressure outside the cavity, air flows into the cavity. The cavity can, for example, be designed as chamber with a partially or completely fluid-tight wall. The hole can be designed in such a way that only a constant limited volume stream can pass through the hole. The air inside the cavity can thus, for example, function as damper.

The cavity is designed flexibly deformable. By decreasing the volume of the cavity, the inner pressure rises. Upon increasing the volume of the cavity, the inner pressure falls. The head-engaging front face is, for example, in operative connection with the cavity in such a way that when a change of position of the head-engaging front face in the direction of the cushion support is caused by a load, the volume of the cavity is decreased. In the case of a change of position of the head-engaging front face in the seat direction caused by a reset force, for example, the volume of the cavity increases. The reset force can, for example, be formed by an elastic reset force of the cushion material. Alternatively or additionally, the reset force can be generated by a spring.

The cushion of the side portions of the cushion body has, for example, relative to the middle portion of the cushion body, a higher degree of stiffness. In the middle portion, the cushion can, in the case of a load on the head-engaging front face, recede by decreasing the volume of the cavity between the side portions, whereby the head-engaging front face, for example, takes on a U-shape and forms side abutments that prevent rotation as well as a side-to-side movement of the head of the occupant of the motor vehicle.

The advantage of the invention is that the headrest in accordance with the invention has a head-engaging front face that has no elements that project to the side of the head, which, for example, impair the view of the driver or impair his freedom of movement. Only in the case of a load on the head-engaging front face due to the head of the seat occupant does the middle portion of the head-engaging front face recede relative to the side portions because of the load and form side abutment faces. While the middle portion of the head-engaging front face deforms, the side portions of the head-engaging front face essentially maintain their original shape or deform only slightly. The higher degree of stiffness of the side portions of the cushion body ensures a high degree of safety for the occupant, as the headrest provides side abutments with a high degree of stiffness upon exposure to a load, which prevent undesired side-to-side motions or rotation of the head of the seat occupant.

At least one partial portion of the cavity can, for example, be designed essentially as a chamber that is closed fluid-tight. Within the scope of the invention, essentially fluid-tight means that the fluid can primarily exit the chamber through the hole or can flow into the chamber through the hole. It is possible, for example, that the chamber is provided with a lining made of a fluid-tight material. A part of the cavity provided in the head cushion can, for example, form the chamber at least partially. Hence, small amounts of the fluid can pass through the lining, for example. These amounts are, however, small in relation to the amount that flows through the hole.

In the concave or U-shaped position, the head-engaging front face forms abutments approximately horizontal to the sitting direction. "Horizontal to the seat direction" means, within the scope of the invention, that the abutment can absorb a horizontal force generally perpendicular to the vehicle travel direction. Additionally, the abutment can, for example, also absorb forces that act vertically.

Within the scope of the invention, a cushion can be any elastic or plastically deformable solid body. The cushion is, for example, made of foam, for example, polyurethane. A cavity of the cushion is, within the scope of the invention, a portion that is at least partially surrounded by the cushion, in which no elastic or plastically deformable solid body is located.

A first embodiment of the headrest is characterized in that the space formed between the cushion support and the head-engaging front face can, for example, be a part of a cavity in which the cushion support is housed. According to an alternative embodiment, a separate cavity can be provided in the cushion to form the space. A cushion portion forming the head-engaging front face can, for example, overlap a support that is fastened directly or indirectly at the cushion support like a dome, with the space formed between the support means and the cushion. A portion of the inner wall of the cavity, which also deforms during deformation of the head-engaging front face is, for example, not supported by the cushion support.

A further embodiment is characterized in that a first abutment face of the cushion support forms brace for a force that acts perhaps counter to the seat direction and that the space is formed between the first abutment face of the cushion support and the head-engaging front face. The first abutment face can, for example, partially delimit the yielding space. According to an alternative embodiment, cushions can be provided between the yielding space and the first abutment face.

A further embodiment is characterized in that between the head-engaging front face and the cavity, a bar-like cushion portion is formed. The bar-like or dome-like cushion portion can easily be deformed into the support position by a force that acts upon the head-engaging front face.

A further embodiment is characterized in that the cushion body has a vertical center portion as well as vertical side portions, and a cavity of the cushion is located essentially in the center portion. The head-engaging front face can be deformed more easily at the center due to the cavity in the center portion than in the side portions. The side portions of the cushion body can, for example, have a larger degree of resistance against deformation due to reinforcement means. These types of reinforcement means can, for example, be formed by a abutment face of the cushion support. Alternatively or additionally, reinforcement means can be formed by a stiffer cushion material. The cushion material of the side portions can, for example, be formed by harder foam.

A different design of the invention is characterized in that the cavity forms a yielding space for a cushion portion that is in operative connection with the head-engaging front face. For example, the cushion portion can be connected by movement with the head-engaging front face. A yielding space can, for example, be a cavity, the volume of which changes during deformation of the cushion portion and whose cavity contains no thrust bearings, which counteract a deformation of the cushion portion. A fluid contained in the yield portion such as, for example, air, does not provide any resistance against the deformation of the cushion portion, for example, when it can flow out of the yielding space unimpeded.

A further embodiment is characterized in that a fluid, in particular air, can flow unimpeded into the cavity and out of the cavity. The cushion forming the cavity can be provided with holes through which the fluid can pass unimpeded. Within the scope of the invention, unimpeded flow means that in the case of a change of the volume of the cavity, pressure compensation between the pressure in the cavity and the ambient pressure can occur within a negligibly short time.

A different embodiment of the invention is characterized in that the head-engaging front face is prestressed for resetting in such a way that it can be displaced back into the rest position as a result of releasing the load on the head-engaging front face. The reset force can, for example, be formed by the elastic reset capacity that is intrinsic to the cushion material. For example, the cushion portion that forms the head-engaging front face can have an elastic resetting capacity upon deformation.

A further embodiment is characterized in that a portion of the cushion that is in operative connection with the head-engaging front face borders on the cavity. Within the scope of the invention, operative connection means that during a deformation of the head-engaging front face, a deformation of the cushion portion that borders the cavity takes place. The cushion portion abutting the cavity is thus at least partially unsupported by a thrust bearing and is therefore deformable by changing the shape of the cavity. During deformation of the head-engaging front face, for example, deformation of the cushion portion abutting the cavity can occur, accompanied by a change of volume of the cavity.

According to a further embodiment of the invention, the cushion body comprises a bumper or device for damping the impact energy caused by the head of the seat occupant. The damping device can, in addition to the cushion, dampen the impact of the head of the seat occupant on the cushion body.

The damping device can, for example, comprise a bumper, fastened to the first abutment face or to the bar-like cushion portion. The bumper can be made of any material that can be elastically or plastically deformed by the effect of a force. The bumper can, for example, comprise a fluid, with the damping occurring by compression of the fluid.

A further embodiment is characterized in that the yielding space is designed as a fluid-tight chamber with at least one hole and that in the event of a pressure difference between the yielding space and ambient pressure, compensation is possible due to the hole. In this embodiment, the damping device comprises a completely or partially fluid-tight chamber, only a limited volume stream being able to pass through the at least one hole in the wall of the chamber. The size of the volume stream passing through the hole depends on the inner pressure of the chamber. Upon impact on the head-engaging front face, the chamber deforms and the chamber volume decreases. The air contained in the cavity can only pass through the hole to a limited degree and is thus compressed, so pressure in the cavity increases. The impact on the cushion body is damped in this way.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
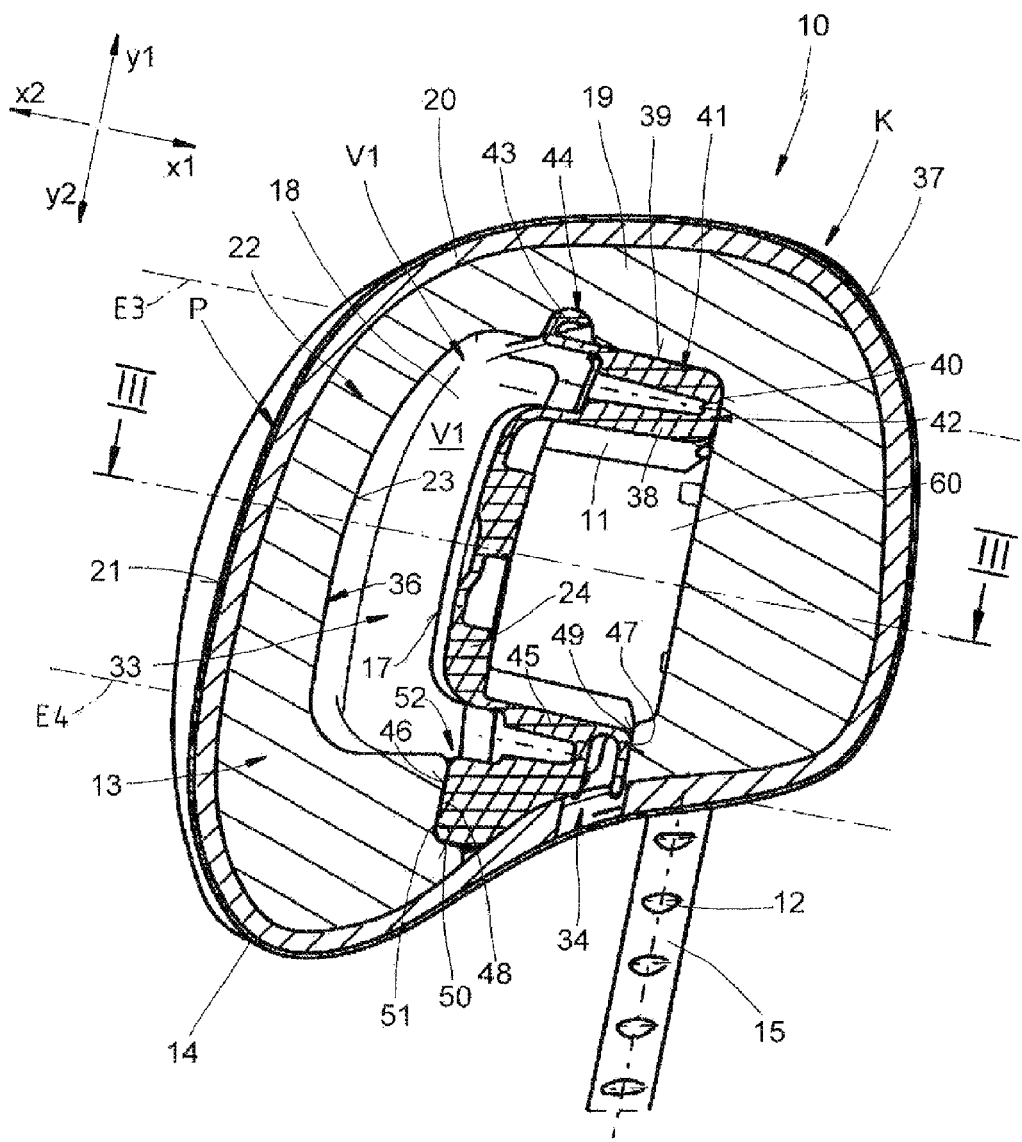
FIG. 1 is a vertical section through a first embodiment of the invention in a rest position.
Figure 2:
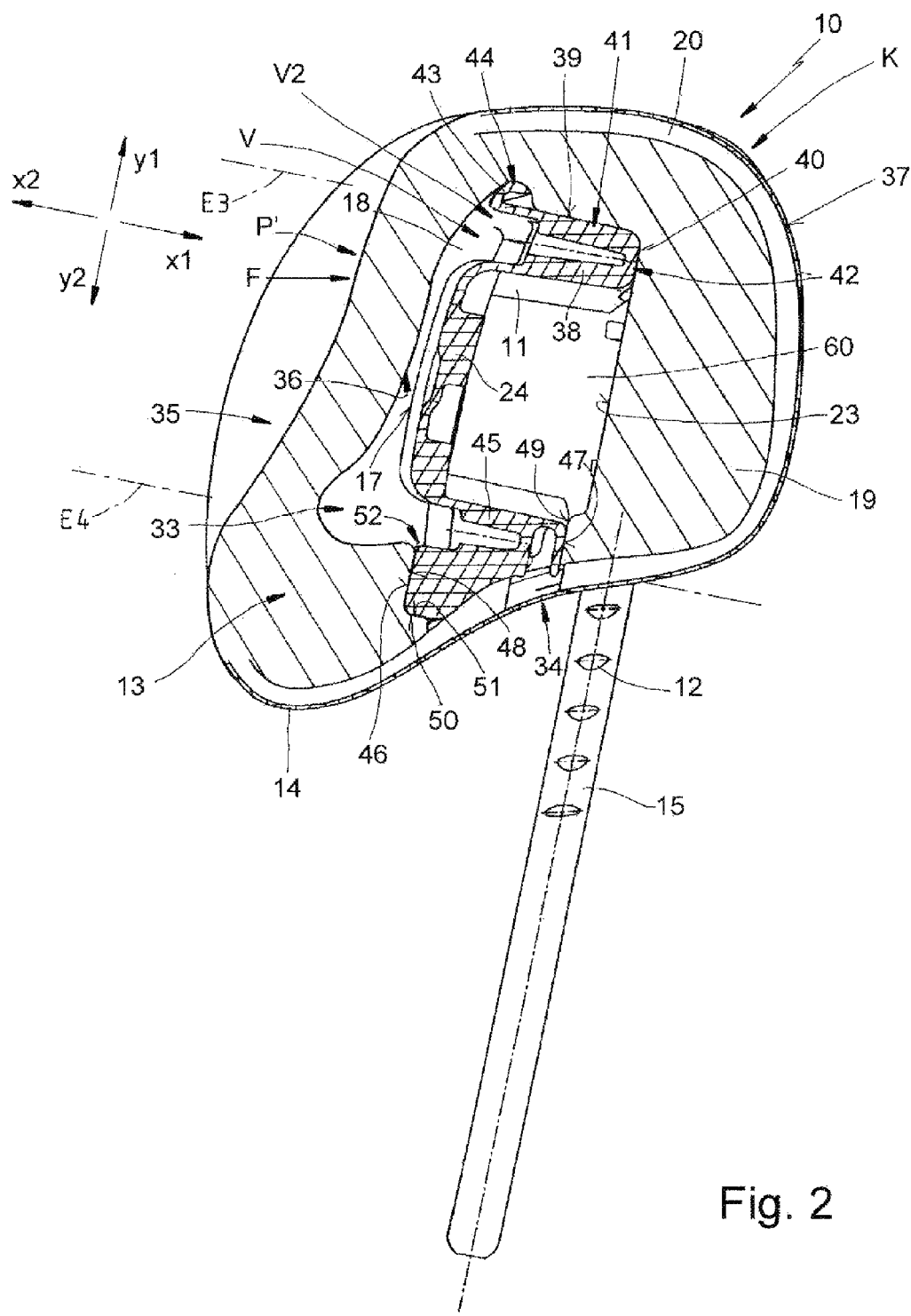
FIG. 2 is a view like FIG. 1 of the first embodiment in a braced or deflected position.
Figure 3:
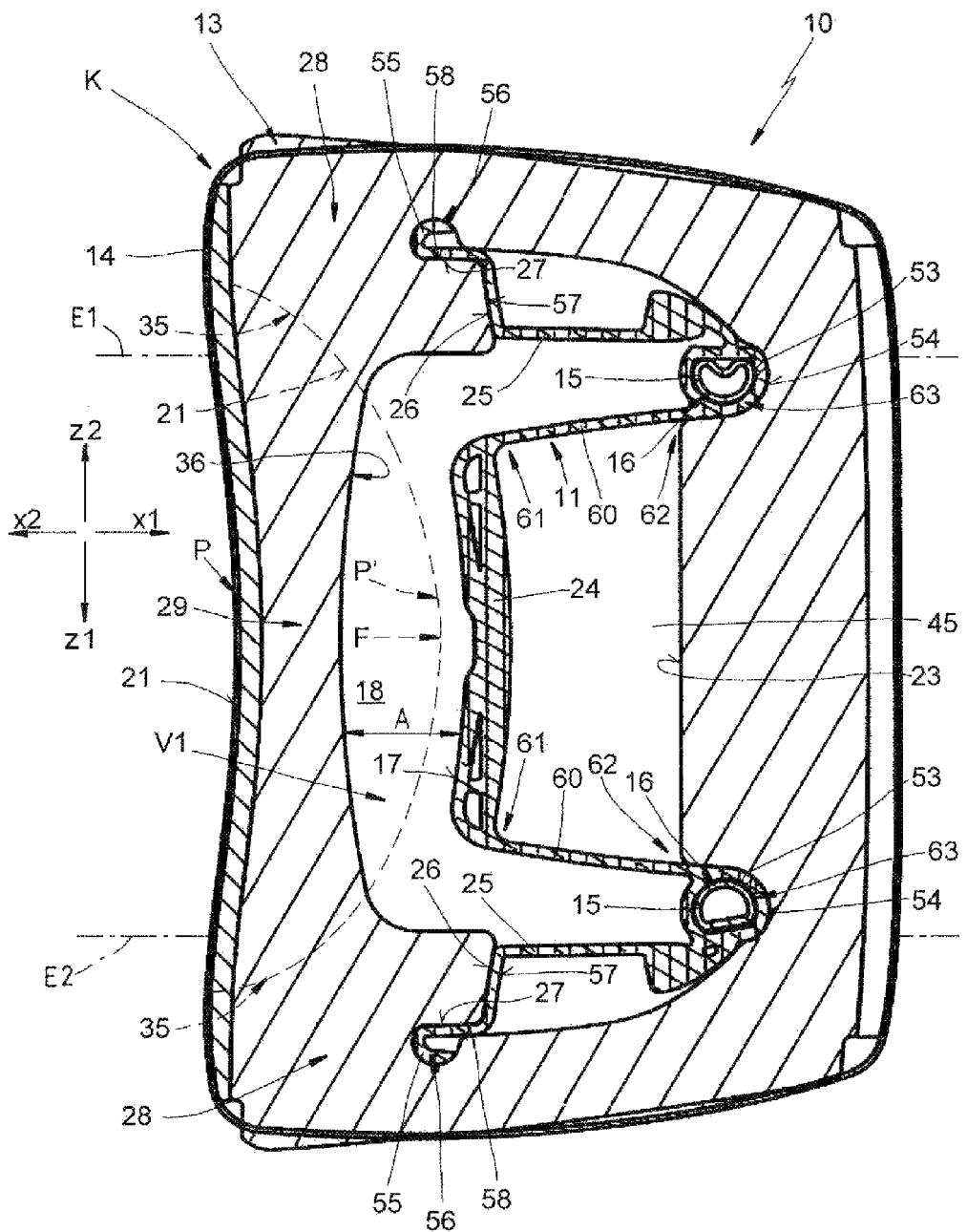
FIG. 3 is a section taken along line of FIG. 1.

As seen in FIGS. 1-3 a headrest 10 has a cushion body K carried on a rigid cushion support 11 mounted on rods 15. The cushion support 11 is, for example, formed of sheet metal or plastic. The rods 15 can be moved vertically in an unillustrated seat back of a motor-vehicle seat. For snap interlocking at different heights, the rods 15 have stop notches 12.

The rods 15 are secured at their upper ends in seats 16 (FIG. 3) of the support 11 and are solidly connected in this way with the cushion support 11 so that it is relatively stationary, that is not movable relative to the vehicle in which it is mounted. According to an unillustrated alternative embodiment, the cushion support 11 can, for example, be mounted on the rods 15 in such a way that the cushion support 11 can be move relative to the rods 15 that themselves are fixed in the unillustrated seat back.

A cushion 13 is secured to the support 11. Here the cushion 13 has a foam core 19, a foam cover 20, and an outer textile cover 14. The outer cover 14 forms an outer surface 37 of the body K. The core 19 of the cushion 13 is formed with a cavity 18 having an inner surface 23 formed by the cushion 13. A back face of the cavity 18 receives the cushion support 11.

A first upper wall or part 38 of the cushion support 11 has an upper face 39 and a back face 40. The generally horizontal upper face 39 is roughly perpendicular to the generally vertical back face 40. The upper face 39 bears on a portion 41 of the inner surface 23, and the back face 40 bears on another portion 42 of the inner surface 23. The portion 41 is generally horizontal and generally perpendicular to the generally vertical portion 42. A bead 43 of the upper part 38 fits snugly in a recess 44 of the foam core 19.

A second lower wall or part 45 of the cushion support 11 has a front face 46 and a back face 47. The front face 46 bears on a counter face 48 of the foam core 19, and the face 47 bears on another counter face 49 of the foam core 19. A generally horizontal lower face 50 of the lower part 45 is roughly perpendicular to the generally parallel and vertical faces 46 and 47 and abuts an upwardly directed counter face 51 of the foam core 19, which in turn is generally perpendicular to the face 48.

The support 11 is also unitarily formed with vertical side parts or walls 60 that extend between the upper part 38 and lower part 45. A front end 61 of each side wall 60 is connected with a disk-shaped front wall or part 24 of the support 11 and a rear end 62 of each side wall 60 with a part 63 that forms a respective one of the seats 16. The part 24 connects the upper part 38 and the lower part 45, as well as the two side parts 60, forming together with the parts 38, 45, and 60 a stiff rearwardly open cup fixed atop the rods 15. In FIG. 1, only one of the side parts 60 is shown, but both are shown in FIG. 3.

A rearwardly facing portion 36 of the inner surface 23 spacedly confronts the abutment face 17 but in the rest position of FIGS. 1 and 3 does not normally touch the cushion support 11 and is not supported by the cushion support 11, but is at a spacing A from cushion support 11. The spacing A is not constant in this embodiment. The portion 36 is formed approximately between vertical planes E1 and E2 (FIG. 3), as well as generally horizontal planes E3 and E4 (FIGS. 1 and 2). Between the abutment face 17 and the inner wall 23, a space 33 is thus formed by the cavity 18 into which the head-engaging portion 22 can move when a rearwardly directed force F is applied to the front face 21.

The space 33 formed between the rearwardly directed face 23 and the forwardly directed abutment face 17 thus permits elastic deformation of the head-engaging portion 22 in such a way that the head-engaging front face 21 can deform in a rearward direction x1 toward the abutment face 17. This way, with a big enough rearwardly directed force F, the rear face 23 can contact the abutment face 17. Some of the force F that was not transmitted by the cushion 13 to the parts 38, 45 and 25 of the cushion support 11 can be absorbed by contact of the head-engaging portion 21 with the abutment face 17, so that the acceleration of the head of the seat occupant is braked as if by springs. This spring effect is, for example, generated by elastic deformation of the cushion 13.

Due to the natural elasticity of the material of the foam core 19, the cushion 13 is prestressed into the starting or rest position of FIG. 1. As soon as the rearwardly directed force F bearing on the head-engaging front face 21 decreases, the head-engaging front face 21 therefore moves back in a forward direction x2 into the original position.

A volume V1 of the yielding space 33 of the cavity 18 is changed by deformation of the cushion 13. If the head-engaging front face 21 is loaded by a force F so that the head-engaging portion 22 of cushion 13 is moved by the load from a position P shown in FIG. 1 in the rearward direction x1 into a position P' shown in FIG. 2, the volume of the space 33 decreases from V1 according to FIG. 1 to V2 according to FIG. 2. If the head-engaging portion 22 of the cushion 13 moves back into the starting position by its own elastic return force, the volume of the cavity 18 increases back to V1.

A fluid contained in the cavity 18, in the present embodiment air, can flow unimpeded out of or into the cavity 18, depending on the relationship of the inner pressure of the chamber to the ambient pressure. The air can, for example, flow into or out of the cavity 18 through a hole 52 in the foam core 19 and a hole 34 in the foam cover 20. Although the cover 14 is stretched over the hole 34, air can easily pass through the cover 14, but essentially without resistance since the textile material of the cover 14 is permeable to air.

If higher pressure predominates in the cavity 18 with respect to the ambient pressure, air escapes from the cavity 18. If the pressure in the cavity 18 is lower than the ambient air, air flows into the cavity 18. Depending on the change in the volume of the cavity, pressure compensation between the cavity 18 and the interior of the motor vehicle occurs automatically in a negligibly short time.

Because of the solid connection of the front wall 24 to the side walls 60, as well as to the upper part 38 and the lower part 45, a force acting upon the abutment face 17 is counteracted with a spring action by limited rearward elastic deformation of the front wall 24, and concomitant limited elastic deformation of the side walls 69 and top and bottom walls 38 and 45. The force that acts upon the abutment face 17 is mainly transmitted to the bearing portion 63 and the rods 15.

A seat 53 formed in the inner surface 23 of the foam core 19 engages a rear face 54 of the support 11 and thereby snugly surrounds this outer surface 54. In addition, FIG. 2 shows how the cushion support 11 has support profiles 25 laterally flanking the side walls 60. A bead 55 is formed at a front edge of each such support profile 25. Each bead 55 fits snugly in a respective seat 56 of the foam core 19.

Each support profile 25 furthermore forms a horizontally and forwardly directed abutment face 26 as well as a vertical abutment face 27. A surface portion 57 of the foam core 19 abuts the face 26 and a surface portion 58 of the inner surface 23 abuts the face 27. The abutment face 26 can, among other things, absorb forces of the cushion 13 that act in rearward direction x1, preventing the outer edges of the cushion 13 from moving backward. Relative movement of the entire cushion 13 in the horizontal directions x1 and x2 as well as in vertical directions y1 and y2 with respect to the cushion support 11 is prevented in this way by engagement of the foam core 19 on the cushion support 11.

When the seat occupant does not press his/her head rearward against the head-engaging front face 21, it remains in the position P in FIGS. 1 and 2 due to its own elastic reset force.

If the head of the vehicle occupant exerts the force F rearward against the head-engaging front face, the head-engaging portion 22 and the head-engaging front face 21 formed by the head-engaging portion 22 of the cushion 13 is deformed in rearward direction x1, and the head-engaging front face 22 according to FIGS. 2 and 3 deforms into the forwardly concave shape identified as P'. The portion 36 of the inner surface 23 can contact the abutment face 17 in the event of a large force F.

The vertical planes E1 and E2 divide the cushion body K into side portions 28 and a center portion 29. The space 33 is located behind the center portion 29. The side portions 28 of the cushion body K have, with respect to the center portion 29, a higher degree of stiffness and deform only slightly. The head of the occupant can engage between the side portions 28 in the direction x1. The head-engaging front face 21 occupies position P' shown in FIG. 2 and in FIG. 3 by a dotted line, whereby the head-engaging front face 21 is displaced in direction x1 with respect to its original position P. In position P', the head-engaging front face 21 surrounds the back of the person's head with respect to position P and supports the head in direction x2, as well as in vertical directions y1 and y2 or horizontal directions z1 and z2 (FIG. 3), and thus prevents rotation as well as a lateral movement of the head in direction y1, y2, z1, or z2. In position P', the head-engaging front face 21 forms side supports 35.

The volume of the yielding space 33 decreases upon a change of position of the head-engaging front face 21 in direction x1. Some of the air that is in cavity 18 escapes automatically through holes of cavity 18 that is not designed fluid-tight such as, for example, the hole 34 in a lower portion of the cushion 13.

Figure 4:
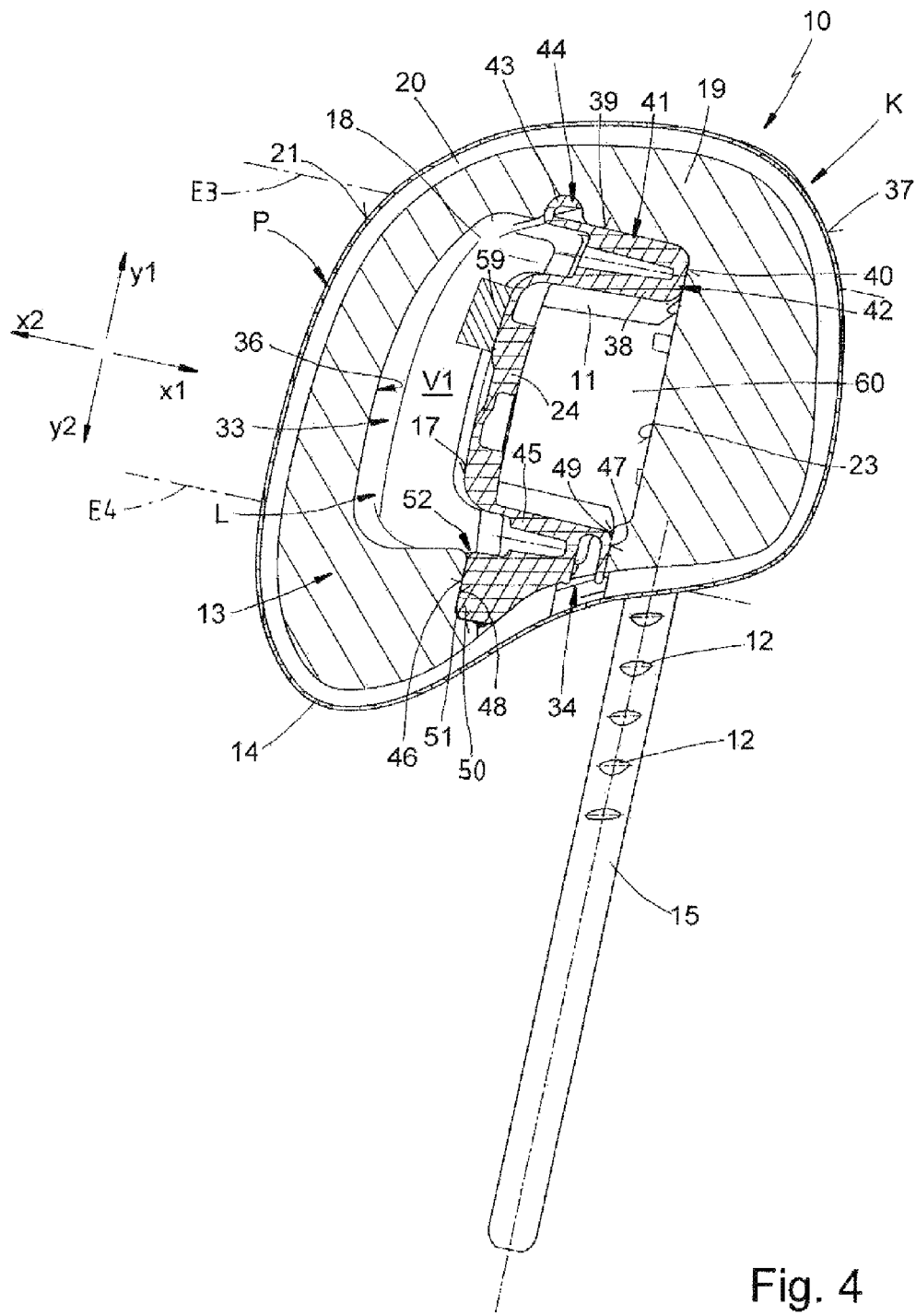
FIGS. 4 and 5 are views like respective FIGS. 1 and 2 of a second embodiment of the invention.
Figure 5:
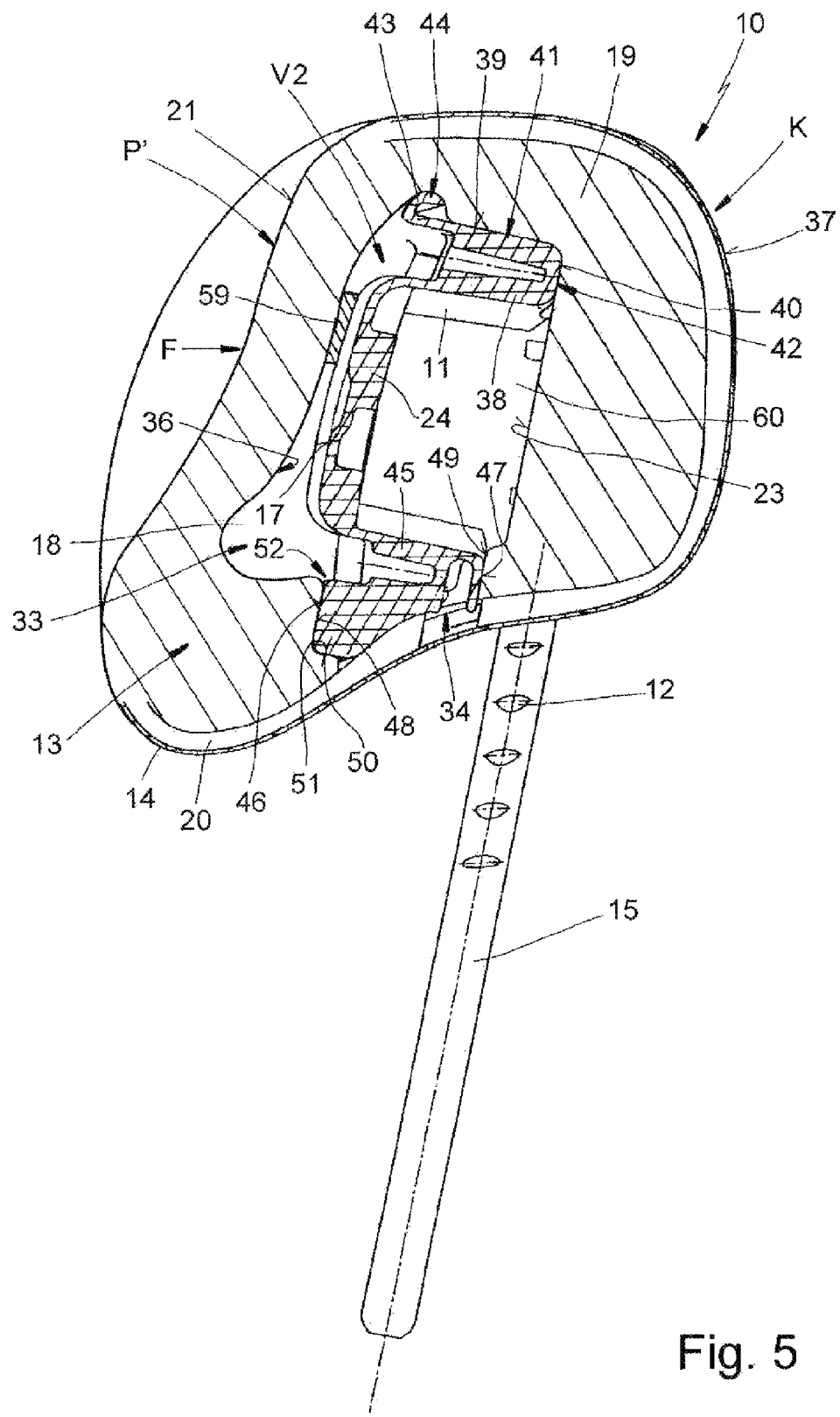
Figure 6:
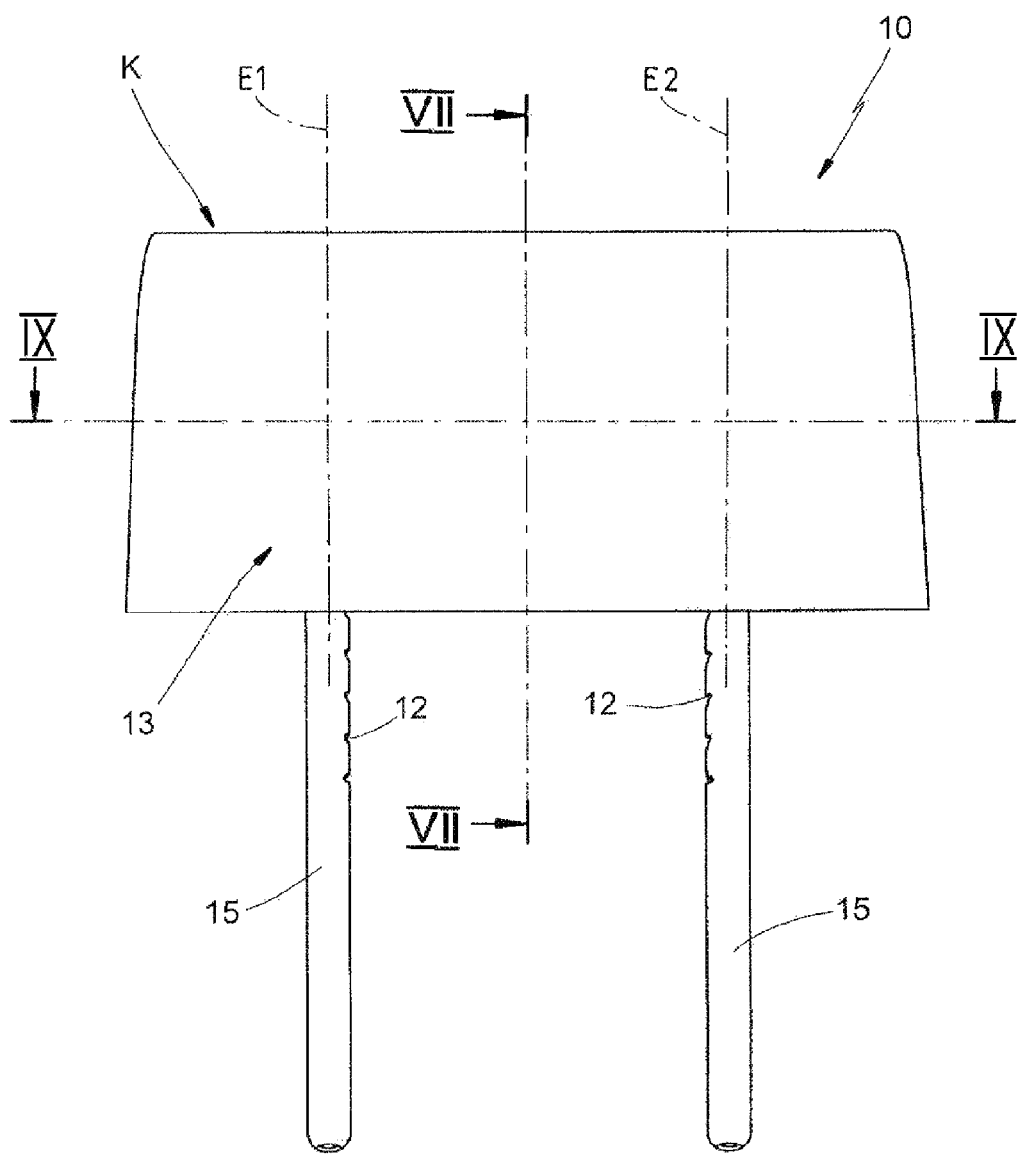
FIG. 6 is a front view of a third embodiment of the invention.
Figure 7:
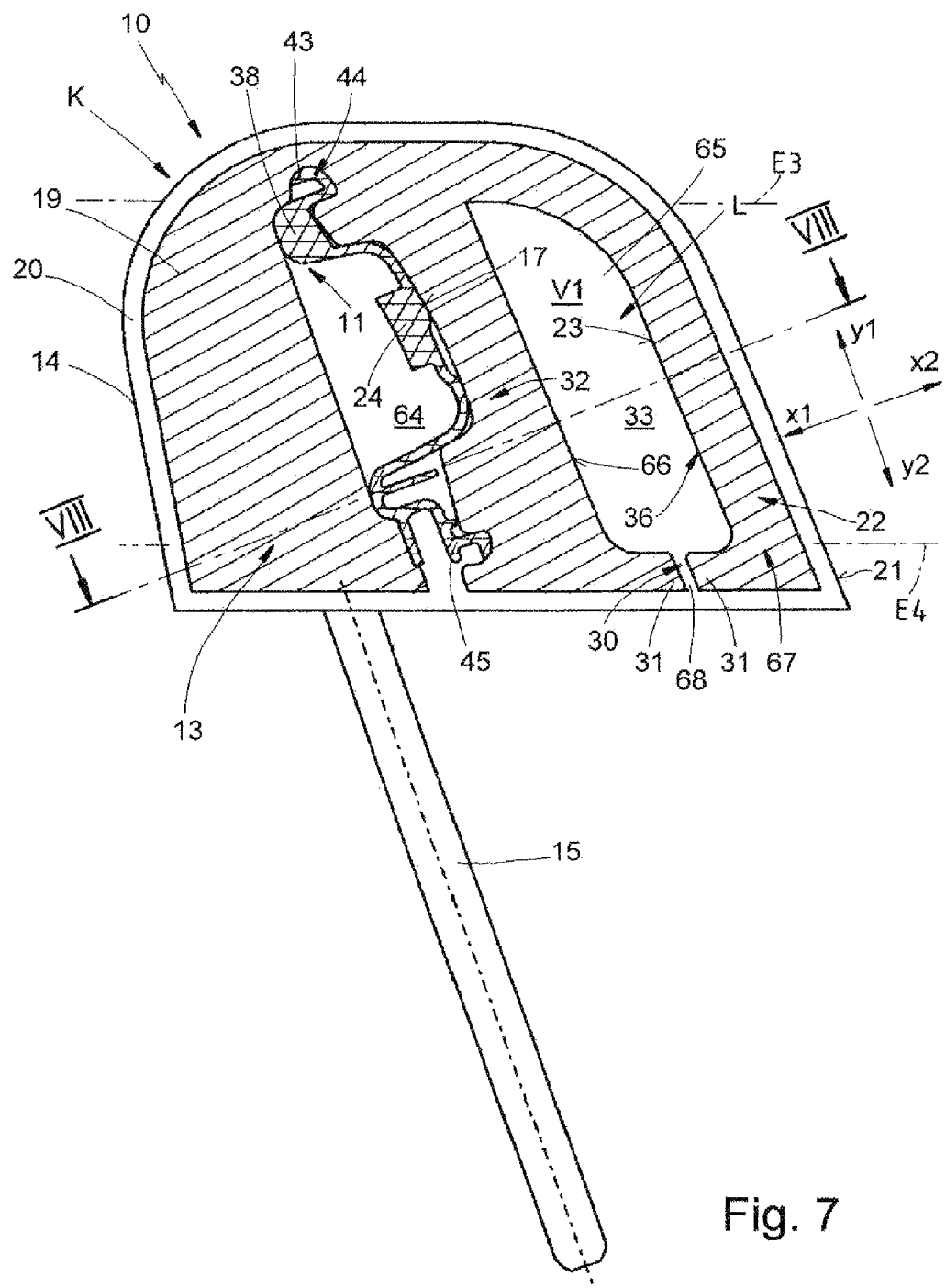
FIG. 7 is a section taken along line VII-VII of FIG. 6.
Figure 8:
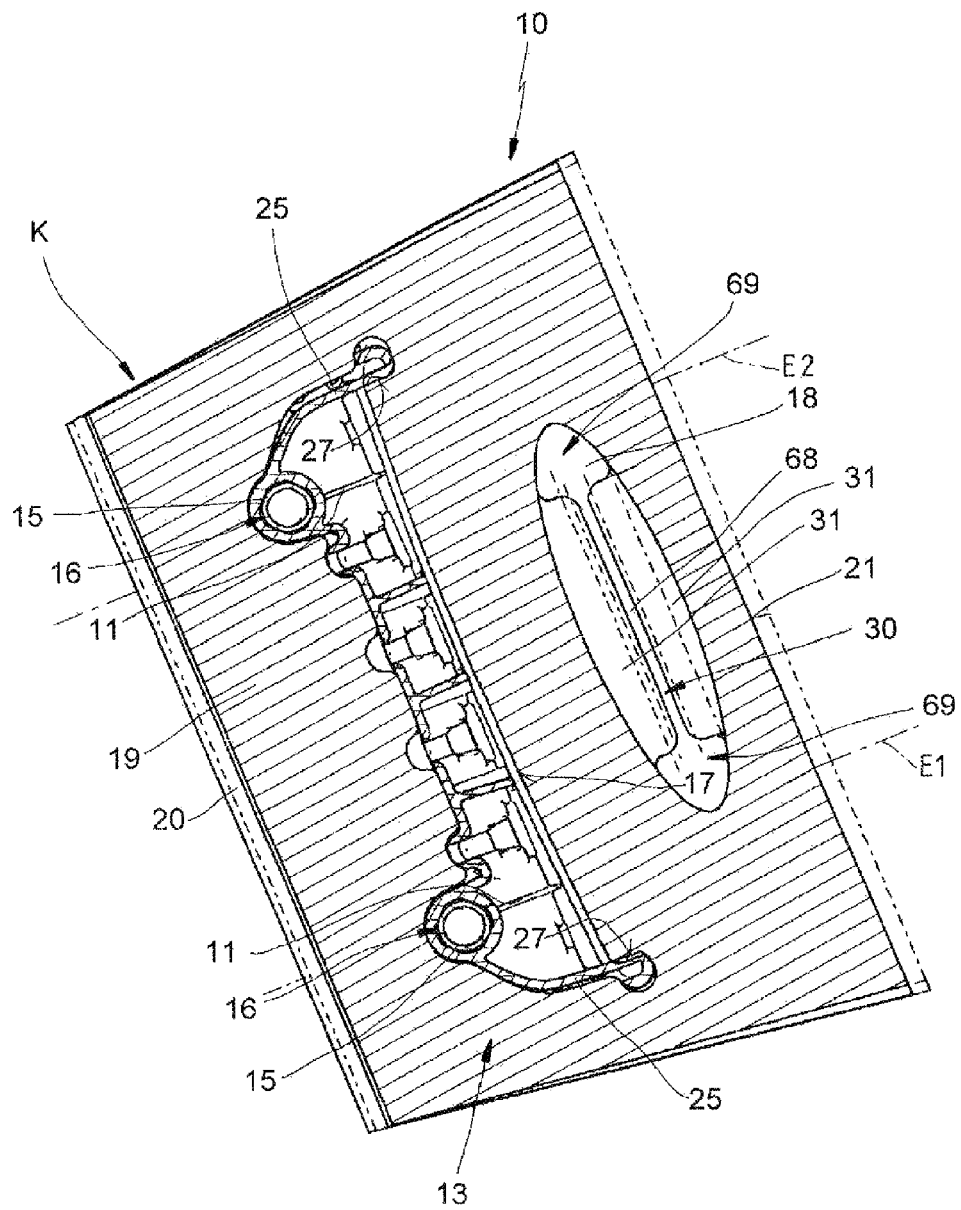
FIG. 8 is a section taken along line VIII-VIII of FIG. 7.
Figure 9:
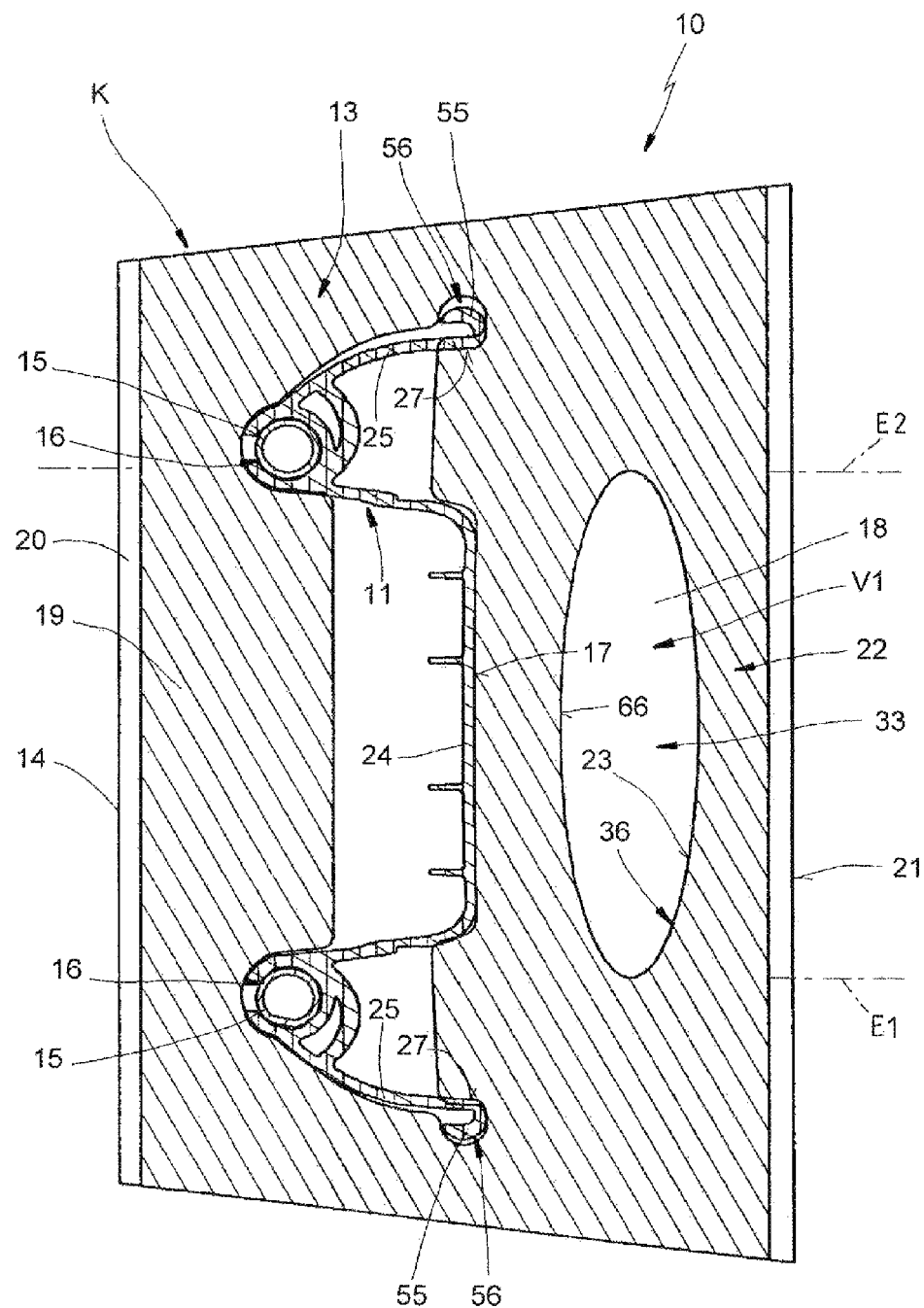
FIG. 9 is a section taken along line IX-IX of FIG. 6.

A second embodiment is shown in FIGS. 4 and 5 that differentiates itself from the first embodiment in that the abutment face 17 carries an elastically crushable bumper 59. If the cushion portion 22 exerts a force on the bumper 59 (see FIG. 5) due to an impact on the head-engaging front face 21, the bumper 59 deforms and thereby dampens the impact.

A third embodiment of the headrest 10 is shown in FIGS. 6 to 9. The headrest 10 according to the third embodiment comprises a first cavity 64, as well as a second cavity 65 of the foam core 19. The foam core 19 is formed with a hole or passage 30 that connects the cavity 18 with the exterior. A part 36 of the face 23 cannot come into direct contact with the abutment face 17, because a cushion portion 32 is formed between the cavity 65 and the abutment face 17.

In the case of a heavy load on the head-engaging front face 21 due to a force F2, the cushion 13 deforms and the volume of the cavity 65 decreases. The portion 36 of the inner surface 23 can come in contact with a portion 66 of the inner surface 23 that is opposite to the cavity 65 and transmit some of the force F2 to the cushion portion 32. This leads to deformation of the cushion portion 32. From the cushion portion 32, some of the force F2 can be transmitted by the abutment face 17 to the front support wall 24. Just like in the first embodiment, the front wall 24 can also be elastically deformed in the embodiment according to FIGS. 6 to 9, as a result of which the force acting upon the abutment face 17 can be elastically transmitted to the fixed rods 15.

When the volume of the cavity 65 changes, air can flow, for example, through the hole 30 into the cavity 65 or out of the cavity 65. The hole 30 is forms as a slot 68 in a central portion between lips 31 of the cushion 13. The lips 31 engaged each other when the head-engaging portion 21 is acted upon by a force F and but are spaced otherwise at a lower portion 67 of the cushion body K. The lips 31 prevent the head-engaging portion 22 in lower portion 67 from moves undesirably far in the direction x1. When the lips 67 are in contact, air can flow through end gaps 69 of the hole 30

I claim:

1. A motor-vehicle headrest comprising:
a support structure positioned horizontally rearward of a head of a person sitting in front of the headrest; and
a cushion having a front face with a central portion directly engageable with the head of the person and with a pair of side portions horizontally flanking the central portion and not normally directly engageable with the head of the person, the side portions being stiffer than the central portion, the cushion having a rear face bearing rearward of the side portions directly on the support and forming between the side portions a substantially empty cavity at which the rear face is spaced at the central portion forward from the support to form rearward of the central portion a substantially empty chamber, the cushion being formed with a passage connecting the chamber with the exterior and being elastically deformable such that on forceful rearward engagement of the head of the person with the central portion of the front face the front face deforms into a forwardly concave shape with the side portions cupping the head of the person and the cushion expelling air through the passage from the chamber and limiting rearward movement of the rear face at the central portion on rearward deformation.

2. The motor-vehicle headrest defined in claim 1 wherein the cushion is formed of synthetic-resin foam.

3. The motor-vehicle headrest defined in claim 1 wherein the rear face is concave toward the support.

4. A motor-vehicle headrest comprising:
a support structure positioned horizontally rearward of a head of a person sitting in front of the headrest; and
a cushion having a front face with a central portion directly engageable with the head of the person and with a peripheral portion surrounding the central portion and not normally directly engageable with the head of the person, the cushion having a rear face bearing rearward of the peripheral portion directly on the support and forming a substantially empty cavity at which the rear face is spaced forward from the support, the cushion being formed rearward of the central portion with a substantially empty chamber and with a passage connecting the chamber with the exterior, the cushion being elastically deformable such that on forceful rearward engagement of the head of the person with the central portion of the front face the front face deforms into a forwardly concave shape cupping the head of the person and the cushion expels air through the passage from the chamber, the chamber being formed between front and rear lips that in an undeformed condition of the cushion are spaced from each other and then in a rearwardly compressed condition of the cushion engage each other and limit air flow out of the chamber.

5. A motor-vehicle headrest comprising:
a support structure positioned horizontally rearward of a head of a person sitting in front of the headrest;
a cushion having a front face with a central portion directly engageable with the head of the person and with a peripheral portion surrounding the central portion and not normally directly engageable with the head of the person, the cushion having a rear face bearing rearward of the peripheral portion directly on the support and forming a substantially empty cavity at which the rear face is spaced forward from the support, the cushion being elastically deformable such that on forceful rearward engagement of the head of the person with the central portion of the front face the front face deforms into a forwardly concave shape cupping the head of the person; and
a bumper carried on the support and engageable with the central portion on rearward deflection of the central portion.

6. The motor-vehicle headrest defined in claim 1, wherein the support structure is relatively stationary and rigid.

* * * * *